(12) United States Patent
Taggi et al.

(10) Patent No.: US 6,824,929 B2
(45) Date of Patent: Nov. 30, 2004

(54) METHOD AND ELEMENT FOR HOLOGRAPHIC REPLICATION

(75) Inventors: Arthur John Taggi, Hockessin, DE (US); Mark Leaman Armstrong, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 255 days.

(21) Appl. No.: 10/137,055

(22) Filed: May 1, 2002

(65) Prior Publication Data

US 2002/0163681 A1 Nov. 7, 2002

Related U.S. Application Data

(63) Continuation-in-part of application No. 09/270,920, filed on Mar. 16, 1999, now abandoned.

(51) Int. Cl.$^7$ .............................................. G03H 1/04
(52) U.S. Cl. ................ 430/1; 430/2; 359/12; 359/35
(58) Field of Search .................. 430/1, 2; 359/12, 359/35

(56) References Cited

U.S. PATENT DOCUMENTS

| | | | | |
|---|---|---|---|---|
| 3,623,798 A | * | 11/1971 | Sheridon | 359/1 |
| 3,658,526 A | * | 4/1972 | Haugh | 430/1 |
| 3,687,703 A | * | 8/1972 | Ohashi et al. | 430/564 |
| 4,396,708 A | * | 8/1983 | Ogawa et al. | 430/529 |
| 4,421,317 A | * | 12/1983 | Hector et al. | 273/313 |
| 4,460,272 A | * | 7/1984 | Parrini | 355/91 |
| 4,575,398 A | * | 3/1986 | Tschishow | 156/99 |
| 5,726,782 A | * | 3/1998 | Kato et al. | 359/3 |
| 5,781,317 A | * | 7/1998 | Kawazoe et al. | 359/12 |
| 5,825,514 A | | 10/1998 | Dausmann et al. | 359/10 |

FOREIGN PATENT DOCUMENTS

| | | | | |
|---|---|---|---|---|
| CA | 2189373 | | 4/1997 | |
| GB | 2119111 | * | 11/1983 | 359/12 |
| JP | 59-77479 | * | 5/1984 | 359/12 |

OTHER PUBLICATIONS

Research Disclosures RD 38957 (Sep. 1996).*
Www.phototechmag.com/buying_drkroom.htm.*
"Reproduction and Documentation", 1964 Focal press, pp–238–242.*
Jenkins, Philip "Colour Spearation Negatives", (1958) Focal Press pp. 200–201.*
Grum, Franc et al. "Optical Radiation Measurements" series, vol. 1, "Radiometry" pp. 12,13,18, and 19. (1979).*
Research Disclosure No. 317072 A.
Focal Point (2867 Stonewall Pl. #101, Sanford, FL. 32773) "Anti–Newton Glass Product Bulletin".
Graphics Supply Catalog "Policrom Anti–NewtonSpray LS–41".

* cited by examiner

*Primary Examiner*—Martin Angebranndt

(57) ABSTRACT

A method is disclosed for replicating (copying) a master hologram into a photosensitive layer to produce a copy of the hologram in a manner such that the copy of the hologram is an accurate and true replication of the master hologram with minimum interface-related defects. A holographic element containing a master hologram for use in contact copying is also disclosed.

4 Claims, 1 Drawing Sheet

METHOD AND ELEMENT FOR HOLOGRAPHIC REPLICATION

This application is a continuation-in-part of application Ser. No. 09/270,920 filed Mar. 6,1999, now abandoned.

BACKGROUND OF THE INVENTION

1. Field of the Invention

This invention pertains to a method for replicating (copying) a hologram into a photosensitive layer to produce a copy (replicate) of the hologram in a manner such that the copy is an accurate and true replication of the hologram (e.g., master hologram) with minimum defects.

2. Description of Related Art

Commercially acceptable holograms, used as security elements in graphic arts or as holographic optical elements, must be free of imaging defects. Holographic prior art teaches the importance and necessity of using optically clear, smooth materials which do not cause unwanted surface reflections during holographic processing, and especially during replication of a master hologram to produce a copy (replicate) of the master hologram. Replication by direct contact copying of a master hologram (either a reflection hologram or a transmission hologram) in which the master hologram is in direct contact with a photosensitive layer (e.g., a holographic recording film) is known from the art. With respect to reflection holograms, see, for example, the following references: 1) "Photographic Reconstruction of the Optical Properties of an Object in its Own Scattered Radiation Field", by Yu N. Denisyuk, Soviet Physics—Doklady, 7, pages 543–5 (1962); 2) "Copying Reflection Holograms", by Clark N. Kurtz, Journal of the Optical Society of America, 58, pages 856–7 (1968); and U.S. Pat. No. 4,995,685. With respect to transmission holograms, see, for example, U.S. Pat. No. 4,209,250, which discloses a system for making multiple copies from a stationary planar transmission master hologram, and U.S. Pat. No. 4,973,113, which describes a method and apparatus for making a copy of a transmission hologram from a master. The prior art teaches that such direct contact copying is done by contacting a photosensitive element, comprised of a photosensitive layer and a smooth coversheet, to a smooth master hologram such that a smooth surface of the coversheet is in direct contact with a smooth surface of the master hologram. Frequently, contacting of the two smooth surfaces is effected with use of a vacuum platen that draws the coversheet in close contact with the master hologram. Contact copies made using the above prior art process frequently exhibit a defect known as "Newton's ring" defects, which are circular rings of interference patterns of light and dark areas that appear together with an image of the master hologram in the copied hologram. The present invention provides a contact copying process for accurately reproducing a hologram which is devoid of "Newton's ring" defects and other interference-related defects.

SUMMARY OF THE INVENTION

A method for copying (replicating) a hologram comprises:
(a) placing a photosensitive element in contact with an outer surface of a holographic element containing a master hologram; and
(b) exposing the photosensitive element and the holographic element to a coherent light beam whereby a replicate of the hologram is formed in the photosensitive element;

characterized in that the outer surface of the holographic element has a matte surface with a surface roughness measured by profilometry in the range from 5 to 200 nanometers and has a specular reflectance of at least five percent.

The present method for holographic replication involves using a holographic element (as holographic master) that has an outer surface that is matte, having a surface roughness measured by profilometry in the range from 5 nanometers to about 200 nanometers. The holographic element comprises an optically transparent layer disposed directly adjacent the master hologram, wherein the surface of the optically transparent layer opposite the master hologram comprises the outer surface of the element and has a specular reflectance of at least five percent. The outer surface can be inherently matte or it can be made to be matte by applying a matting agent (e.g., in a spray, in a coating, etc.).

DETAILED DESCRIPTION OF THE PREFERRED EMBODIMENT(S)

Figure 1:
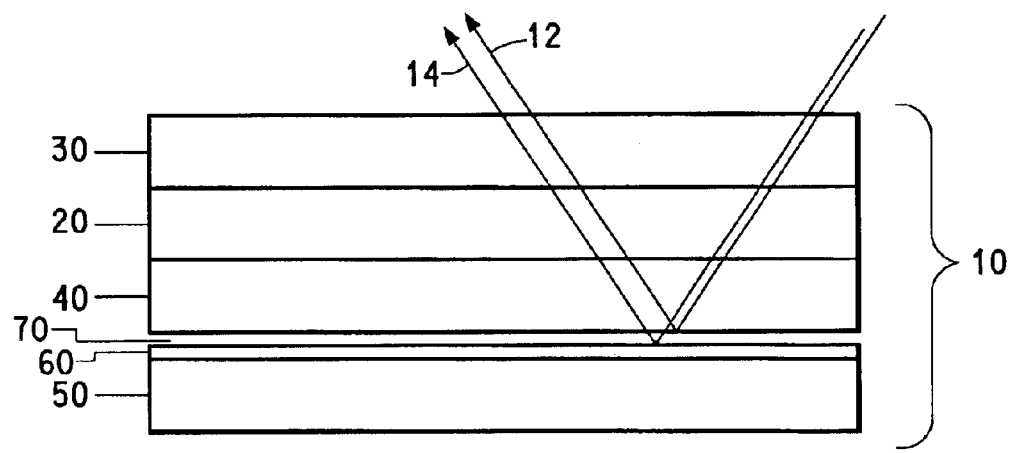
FIG. 1 is an elevation view of an imaging stack showing reflected light rays that produce Newton's rings.

FIG. 1 shows how an interference pattern of light and dark areas (Newton's rings) can form in an imaging stack 10 and be recorded in a photosensitive layer 20 as a result of reflected light rays 12 and 14 following slightly different path lengths within the imaging stack 10 and consequently being out of phase with one another. Other layers of the imaging stack 10 in FIG. 1 are base 30, cover sheet 40, and holographic master 50 with a glass cover layer 60. As illustrated in FIG. 1, there is an air gap 70 between the cover sheet 40 and the glass cover layer 60.

With Newton's ring defects (and more broadly other interference-related defects), this phenomenon results from light interference that arises when light waves are refracted off various interfaces in an imaging stack. At each interface where there is a refractive index mismatch, some of the light is reflected back. In the case where there are two interfaces as illustrated in FIG. 1 (e.g., the outer surface of the cover sheet and the top surface of the glass master), the light waves reflected from these two surfaces, which follow slightly different path lengths, will be out of phase with each other and will interfere with each other. This results in a pattern of light and dark interference fringes. These fringes are sometimes referred to as "Newton's rings". A photosensitive layer, e.g, holographic recording film (HRF), is capable of recording these interference fringes. Since they tend to occur at a frequency and size that is easily visible to the naked eye, they are quite objectionable and make the replicated hologram unacceptable. The intensity of the fringes and any defects in the replicated hologram that result will depend on the refractive index mismatch and the difference in path length between interfering rays.

It is believed that there are two main factors that make it likely that Newton's ring defects will be present in contact copies of holograms with copying done with a smooth interface. First, trapped air cannot escape easily (there is insufficient space for air to be removed, even under vacuum) leaving an air gap between the surfaces, resulting in a large path length difference that produces interference fringes, as shown in FIG. 1. Second, since the differences in refractive indices between cover sheet and air and air and glass are large, there will be a lot of surface reflection. This results in a strong interference pattern which disrupts the replicated image.

The refractive index mismatch is eliminated in either of two ways. One can introduce a "refractive index matching" fluid, which fills in the gap between cover sheet and master with a liquid which has a refractive index close to that of both surfaces. This effectively eliminates surface reflections. The other method is by direct contact of the surface of the photosensitive layer of the HRF to the surface of the master. This eliminates the cover sheet interface from the picture. When the HRF photosensitive layer is in intimate contact with the master, there is also no air gap, with its large refractive index mismatch (the HRF photosensitive layer and glass are close in refractive index), hence there are no surface reflections in this case.

Figure 2:
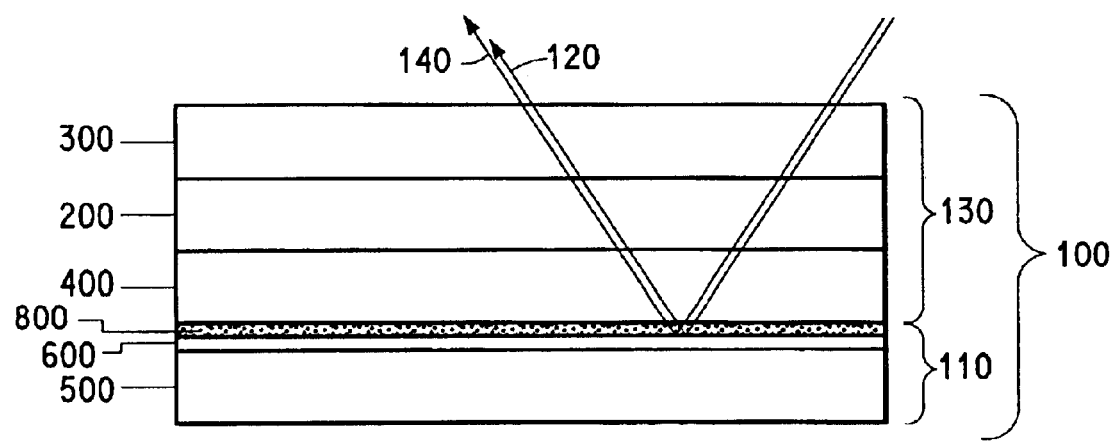
FIG. 2 is an elevation view of the present invention which minimizes interference-related defects.

FIG. 2 shows a preferred embodiment of the present invention in a holographic imaging stack 100 similar to the stack 10 shown in FIG. 1. A holographic element 110 comprises a master hologram 500 disposed adjacent to an optically transparent layer 600. An outer surface 800 of the holographic element 110 has a matte surface with a surface roughness measured by profilometry in the range from 5 to 200 nanometers. In the present embodiment, the outer surface 800 of the holographic element 110 comprises the top surface of the optically transparent layer 600, with the transparent layer 600 either attached to or just contacting the master hologram 500. The rough surface allows for air to be more effectively removed, eliminating the air gap. That eliminates the path length difference between reflected rays 120 and 140, as shown in FIG. 2. In addition, the rough surface promotes light scattering, breaking up the specular reflections. Thus the light interference which causes damage to the replicated images is eliminated. A matte surface at the interface during copying according to this invention has surface roughness measured by profilometry which ranges from 5 to 200 nanometers (or about 200 nanometers). Preferably, the surface roughness is 10 to 130 nanometers; more preferably, it is 20 to 100 nanometers, still more preferably, it is 30 to 90 nanometers; and most preferably, it is 40 to 80 nanometers. The upper limit of surface roughness of about 200 nanometers is only approximate in this invention, since further increases will lead to loss of resolution of the image but for some applications this may be tolerable and suitable if there are tradeoffs in performance of other key properties.

This invention provides a method for replicating a hologram, which may be a holographic master, in a manner such that the resulting replicate (copy) of the hologram is devoid of Newton's ring defects and/or other interference-related defects. In some embodiments, a matting agent is present on the holographic element to provide a matte or roughened outer surface having surface roughness in the range from 5 to 200 nanometers. A variety of matting agents can be employed. Suitable matting agents include, but are not limited to, various fine powders, such as alumina, silica, or talcum. These powders can either be applied as a spray or as a coating on a glass or other optically transparent outer layer of a master hologram.

In some embodiments, the outer surface of the holographic element is comprised of a material that is inherently matte and imparts, to the outer surface, surface roughness in the range from 5 to 200 nanometers. Examples of materials that are inherently matte include, but are not limited to, a variety of extruded optically transparent polymers, e.g., poly(methyl methacrylate), and glass that is etched, e.g., acid etched glass (anti-Newton ring glass). Suitable matting agents for this invention are those that afford a matte surface (e.g., after application in a coating and drying) on the holographic element (and consequently at the interface during copying according to this invention) having surface roughness measured by profilometry which ranges from 5 to about 200 nanometers. Suitable master holograms for use in this invention include, but are not limited to, those made by holographic exposure of photosensitive layers comprising photopolymer, dichromated gelatin, or silver halide emulsion.

During holographic replication of a master hologram 500 using a photosensitive element 130 comprising a base 300, photosensitive layer 200 and coversheet 400, the outer surface of the coversheet 400 of the photosensitive element 130 is preferably contacted with the outer surface 800 of the holographic element 100 to form an imaging stack, as illustrated in FIG. 2. In this invention, it is critical that the interface be matte having surface roughness measured by profilometry which ranges from 5 to 200 nanometers. The interface can be matte having this degree of surface roughness by 1) making the outer surface 800 of the holographic element 110 matte; or 2) applying a matting agent in the outer surface 800 of the holographic element 110, which results in an effective and suitable degree of surface roughness at the interface between the photosensitive element 130 and the holographic element 110. The outer surface 800 of the holographic element 110 can be an imaged photosensitive element, which is an imaged and cured photopolymer layer. Preferably, though, it is a glass surface having this degree of surface roughness. Most preferably, the outer surface of the glass is either acid-etched glass or glass that is coated with a matting agent to give the above degree of surface roughness.

EXAMPLES

The surface roughness averages and statistics for materials in the examples reported below were calculated as an average of 25 averages (average of 25 10 micron segments in a 2.0 mm segment of a given surface analyzed by profilometry) collected using a Sloan DEKTAK 3030ST profilometer (vendor: Veeco Instruments, Inc., Sloan Technical Division, 602 East Montecito St., Santa Barbara, Calif. 93103). A total scan length of 2 mm was measured without autoleveling, without smoothing, at stylus force of 20 mg, and at medium speed. Roughness was calculated using DEKTAK internal software for each 80 micron interval along the 2.0 mm scan.

UV-A exposure in the examples and comparative examples was made in each case using a Vaculux Integrated Exposure System (Unit #2k-3343VSA, Vendor: Burgess Industries, Inc., Plymouth, Minn. 55441) with a 2 kW metal halide bulb. Each exposure was measured using a UV radiometer from EIT Instruments (Sterling, Va. 20164). UV-A is defined to be the 315–400 nm region of the electromagnetic spectrum. See, for example, Light Measurement Handbook, by Alex Ryer, International Light, Inc., Newburyport, Mass. (1997).

Comparative Example 1

This example illustrates that a contact copy, which was made with a photosensitive element having a smooth coversheet in contact with a holographic master having a smooth surface, exhibited a large number of interface-related defects known as Newton's rings.

A contact copy was made with a photosensitive element having a smooth coversheet in contact with a holographic master having a smooth surface. The photosensitive element was OmniDex® 706L film (E. I. du Pont de Nemours and Company, Wilmington, Del.) and consisted of in sequence the following three layers: polyester base, photopolymer layer, and cover sheet. The smooth surface of the master was 30 mil thick drawn glass available from Focal Point Industries (Sanford, Fla.). With cover sheet in place, the outer surface of the film was contacted to the smooth surface of the holographic master using a laydown roll and held in place by vacuum, approximately 19" Hg. A settling time of 15 seconds was used to draw air from the contact interface. A laser exposure was done with intensity of 1 mW/cm$^2$ of approximately 50 mJ/cm$^2$ using the 476 nm line of an Ar+ laser at the master reconstruction angle of 35° from normal incidence. After laser exposure, the copy was decoupled from the master and exposed with UV-A (details given supra) for an approximate exposure of 100 mJ/cm$^2$. Using anOmniDex® Laminator (E. I. du Pont de Nemours and Company, Inc., Wilmington, Del.), the cover sheet was removed from the exposed film and another photopolymer layer, OmniDex® CTF 75 (E. I. du Pont de Nemours and Company, Wilmington, Del.) was contacted to the hologram layer, using a heated roller (100° C.) at a line speed of 2 meters/minute under standard pressure. This laminate was baked at 140° C. for eight minutes. The processed hologram copy was inspected for Newton's rings and other interface-related defects. The hologram copy exhibited a large number of interface-related defects (Newton rings) that were clearly visible as objectionable defects to the naked eyes (of an observer observing under room light conditions).

The OmniDex® 706L coversheet roughness statistics as determined by profilometry were as follows:

| | |
|---|---|
| mean | 2.0 nm |
| std. dev. | 2.1 nm |
| max. | 11.8 nm |
| min. | 1.0 nm |

The coversheet in this example was made by solution coating poly (vinyl chloride) onto a polished stainless steel belt. The "belt side", which had only a very slight surface roughness from the polished steel belt, was the surface which contacted the master hologram in this example.

The master hologram surface roughness statistics as determined by profilometry were as follows:

| | |
|---|---|
| mean | 2.8 nm |
| std. dev. | 1.0 nm |
| max. | 6.7 nm |
| min | 1.9 nm |

Example 1

This example illustrates that a contact copy, which was made with a photosensitive element having a smooth coversheet in contact with a holographic master having a roughened, matte surface, exhibited no interface-related defects known as Newton's rings.

Example 1 was done in the same manner as Comparative Example 1, except that the outer surface of the holographic master in contact with photosensitive element during contact copying had a roughened, matte surface, which consisted of 0.030" thick anti-Newton glass. The processed hologram copy was inspected for Newton's rings and other interface-related defects. The hologram copy exhibited no Newton's rings or other interference defects. No defects were visible to the naked eyes (of an observer observing under room light conditions). The master hologram surface roughness statistics measured by profilometry on the outer surface of anti-Newton ring glass were as follows:

| | |
|---|---|
| mean | 57.6 nm |
| std. dev. | 28.4 nm |
| max. | 118.7 nm |
| min. | 16.9 nm |

The anti-Newton glass employed in this example was obtained from Focal Point Industries, Inc. in Sanford, Fla. 32773, telephone (407) 322-2123, and is sold for use in graphic arts applications.

Comparative Example 2 and Example 2

This example illustrates that a contact copy, which was made with a photosensitive element having a smooth coversheet in contact with a holographic master having a roughened, matte surface (to a significantly higher degree than in Example 1), exhibits other types of defects.

Comparative Example 2 and Example 2 were done in the same manner as Comparative Example 1, except that the outer surface of the holographic master in contact with the photosensitive element during contact copying had an excessive roughened, matte surface, which consisted of 0.030" acid etched glass. The master hologram surface roughness statistics were as follows:

| | |
|---|---|
| mean | 133.5 nm |
| std. dev. | 71 min |
| max. | 446.5 nm |
| min. | 17.2 nm |

The replicated hologram exhibited no interface-related defects known as Newton's rings but did exhibit other imaging defects, including some loss of resolution and fuzziness of the copied hologram, which may be objectionable in some applications and tolerable in others.

Prophetic Example 1

A contact copy is made with a photosensitive element having a smooth coversheet in contact with a holographic master having an initially smooth surface which is coated with graphic arts anti-Newton ring spray to afford a slightly roughened outer surface. The photosensitive element is OmniDex® 706L film (E. I. du Pont de Nemours and Company, Wilmington, Del.) and consists of in sequence the following three layers: polyester base, photopolymer layer, and cover sheet. The smooth surface of the master is 30 mil thick drawn glass available from Focal Point Industries in Sanford, Fla. 32773, telephone (407) 322-2123). A light application of Policrom Anti-Newton Ring Spray LS-41, available from Momentum Graphics, Inc., telephone (800) 848-2583 (which spray is sold for use in graphic arts applications) is applied to the smooth glass surface of the master.

With cover sheet in place, the outer surface of the film is contacted to the now slightly roughened surface of the holographic master using a laydown roll and held in place by vacuum, approximately 19" Hg. A settling time of 15 seconds is used to draw air from the contact interface. A laser exposure is done with intensity of 1 mW/cm$^2$ of approximately 50 mJ/cm² using the 476 nm line of an Ar+ laser at the master reconstruction angle of 35° from normal incidence. After laser exposure, the copy is decoupled from the master and is exposed with UV-A for an approximate exposure of 100 mJ/cm². Using an OmniDex® Laminator (E. I. du Pont de Nemours and Company, Wilmington, Del.), the cover sheet is removed from the exposed film and another photopolymer layer, OmniDex® CTF 75 (E. I. du Pont de Nemours and Company, Wilmington, Del.) is contacted to the hologram layer, using a heated roller (100° C.) at a line speed of 2 meters/minute under standard pressure. This laminate is baked at 140° C. for eight minutes. The processed hologram copy was inspected for Newton's rings and other interface-related defects. The hologram copy exhibits no interface-related defects (Newton's rings).

Prophetic Example 2

A contact copy is made with a photosensitive element having a smooth coversheet in contact with a holographic master having an initially smooth surface, which is coated with talcum powder to afford a slightly roughened outer surface. The photosensitive element is OmniDex® 706L film (E. I. du Pont de Nemours and Company, Wilmington, Del.) and consists of in sequence the following three layers: polyester base, photopolymer layer, and cover sheet. The initially smooth surface of the master is 30 mil thick drawn glass available from Focal Point Industries in Sanford, Fla. 32773, telephone (407) 322-2123. A light application of finely divided talcum powder is applied in the following way: a small amount of the powder (Johnson & Johnson Baby Powder, commonly available at drug or grocery stores) is wafted into the air. The larger, heavier particles are allowed to settle out of the air for several seconds. Then the master is passed through the remaining cloud of fine particles, depositing some on the surface of the master.

With cover sheet in place, the outer surface of the film is contacted to the powdered surface of the holographic master using a laydown roll and held in place by vacuum, approximately 19" Hg. A settling time of 15 seconds is used to draw air from the contact interface. A laser exposure is done with intensity of 1 mW/cm² of approximately 50 mJ/cm² using the 476 nm line of an Ar+ laser at the master reconstruction angle of 35° from normal incidence. After laser exposure, the copy is decoupled from the master and is exposed with UV A for an approximate exposure of 100 mJ/cm². Using an OmniDex® Laminator (E. I. du Pont de Nemours and Company, Wilmington, Del.), the cover sheet is removed from the exposed film and another photopolymer layer, OmniDex® CTF 75 (E. I. du Pont de Nemours and Company, Wilmington, Del.) is contacted to the hologram layer, using a heated roller (100° C.) at a line speed of 2 meters/minute under standard pressure. This laminate is baked at 140° C. for eight minutes. The processed hologram copy is inspected for Newton's rings and other interface related defects. The hologram copy exhibits no interface-related defects (Newton's rings).

Prophetic Example 3

A contact copy is made with a photosensitive element having a roughened coversheet as in Example 2 in contact with a holographic master having a roughened surface as in Example 1. The photosensitive element is OmniDex® 706 film (E. I. du Pont de Nemours and Company, Wilmington, Del.) and consists of in sequence the following three layers: polyester base, photopolymer layer, and cover sheet. The surface of the master is 30 mil thick anti-Newton ring glass, which is available from Focal Point Industries in Sanford, Fla. 32773, telephone (407) 322-2123 and which is sold for use in graphic arts applications. The anti-Newton ring glass has a specular reflectance of at least five percent.

With cover sheet in place, the outer surface of the film is contacted to the surface of the holographic master using a laydown roll and held in place by vacuum, approximately 19" Hg. A settling time of 15 seconds is used to draw air from the contact interface. A laser exposure is done with intensity of 1 mW/cm² of approximately 50 mJ/cm² using the 476 nm line of an Ar+ laser at the master reconstruction angle of 35° from normal incidence. After laser exposure, the copy is decoupled from the master and is exposed with UV-A for an approximate exposure of 100 mJ/cm². Using an OmniDex® Laminator (E. I. du Pont de Nemours and Company, Wilmington, Del.), the cover sheet is removed from the exposed film and another photopolymer layer, OmniDex® CTF 75 (E. I. du Pont de Nemours and Company, Wilmington, Del.) is contacted to the hologram layer, using a heated roller (100° C.) at a line speed of 2 meters/minute under standard pressure. This laminate is baked at 140° C. for eight minutes. The processed hologram copy is inspected for Newton's rings and other interface-related defects. The hologram copy exhibits no interface-related defects (Newton's rings).

By way of comparison, four types of glass were obtained: float (smooth) glass, Anti-Newton glass, obtained from Focal Point Industries, Inc,. Sanford, Fla., Tech Spec™ ground glass, Stock Number K45-655, and commercial quality ground glass, Stock Number K43-725, both of which were obtained from Edmund Industrial Optics, Barrington, N.J. Each type was measured and the specular reflectance (Y%) as defined below was calculated:

$$Y\% = 100 \int_{400}^{750} S(\lambda)R(\lambda)y(\lambda)d\lambda \bigg/ \int_{400}^{750} y(\lambda)d\lambda$$

where
  S ($\lambda$) is the spectrum of a light source, assumed to be flat, i.e. S ($\lambda$)=1;
  R($\lambda$) denotes a spectral reflectance spectrum;
  y($\lambda$) denotes the CIE 1931 y color matching function;
  all taken at 10 nm wavelength ($\lambda$) intervals over the range of 400 to 750 nm.

The glass samples were measured in the following way. A light source (approximating CIE A) was disposed to illuminate a sample at a 35° angle from normal to the glass. This angle is one typically used in recording replicate holograms. A Photo Research PR650 spectroradiometer was disposed to read the reflected light from the glass samples at −35° from normal. The reflectance spectra were recorded, and the calculation as defined was performed with the following results:

|  | Y % |
| --- | --- |
| Flat glass | 22.219 |
| Edmund 45-655 | 0.066 |
| Edmund 43-725 | 0.080 |
| Focal AN | 9.884 |

Replicates were made using master holograms with the above types of coverglasses whose surface treatments range from smooth to heavy ground glass. While ground glass eliminates Newton Rings in vacuum draw-down, the hologram copies are unusable because the image resolution is severely degraded.

The master holograms were recorded in DCG (dichromated gelatin) plates using the 457 nm line of a HeCd (helium-cadmium) laser. The DCG was spin coated onto float glass and dried to achieve a 6 µm thick coating. After laser recording, the DCG plates were wet processed in assorted isopropyl alcohol baths according to techniques known in the art to develop the hologram. The masters were prepared for copying at 45° using the 514.5 nm line of an Argon ion laser.

Two target images were used for the purpose of this experiment. One was a standard US Air Force (1951) Resolution Target. This consists of sets of lines and spaces with each set at smaller spacing than the previous. The elements are oriented in both the vertical and horizontal directions. By finding the set at which the lines and spaces are just resolved, one can determine the resolution of an image in line pairs per millimeter (lp/mm). The second was a graphic arts image of a Roman helmet with high and low resolution features and lettering.

The masters were capped with various types of glass, which included the following: Anti-Newton glass, obtained from Focal Point Industries, Inc,. Sanford, Fla., Tech Spec™ ground glass, Stock Number K45-655, and commercial quality ground glass, Stock Number K43-725, both of which were obtained from Edmund Industrial Optics, Barrington, N.J. Some masters were also capped with commercial float glass (smooth surface). The glass covers were attached to the masters by a UV curable epoxy adhesive.

Replication (copying) of the master holograms was done in the following manner. The individual master holograms were placed into a vacuum chuck. The chuck was part of Replicator 7 located in the replication production area of DHI, Logan. The copying sequence was:

A. Advance a web of OmniDex® 734-1, batch 17-4, Holographic Recording Film (E. I. DuPont de Nemours and Company, Wilmington, Del.) so that an unexposed section lay on the master array. The very smooth PVC coversheet of the film faces the master coverglass.
B. Apply a vacuum to remove air from between the film and master coverglass and run a rubber roller over the film to help eliminate air bubbles in the interface.
C. Wait 20 seconds until draw down is complete.
D. Copy the master image into the film by illuminating the stack with a line scan. The line is composed of laser light (514.5 nm) emitted by a Coherent Sabre argon ion laser oriented at an angle of 45° from normal incidence.
E. After laser exposure, the film containing the copy was advanced into a light box where it was exposed with at least 100 mJ/sq cm of UV "A" radiation (UV "A" radiation is defined to be ultraviolet light of wavelength 315–400 nm in Light Measurement Handbook, by Alex Ryer, International Light, Inc., Newburyport, Mass. (1997)).
F. The images were wound onto a roll.

After the above laser recording, the film was loaded into a laminator where the coversheet was removed and a color tuning film (CTF) was hot roll laminated onto the photopolymer layer that contained the hologram. The color tuning film was OmniDex® CTF 146, batch 66-5 (E. I. DuPont de Nemours and Company, Wilmington, Del.). The lamination conditions were 3 meters per minute with a hot roll temperature of 100° C. Only the roll that was in contact with the CTF was heated. Laminator 3 in the DHI Logan facility was used for the hot roll lamination. The copies that were hot roll laminated with CTF 146 were subsequently baked in an OmniDex® Scroll Oven (E. I. DuPont de Nemours and Company, Wilmington, Del.) at a rate of 3.5 feet per minute (fpm) and at a temperature of 150° C. Scroll oven 4 with scroll cage A in the DHI facility was used.

The above film samples were evaluated by visual observation, using three criteria: resolution as estimated from the US Air Force target, subjective classification of the surface mirror (where Newton's rings would be visible), and overall visual appearance and acceptability of the graphic arts image. A 10× magnifying glass was used. Samples made with masters with either of the commercial ground glass samples are not acceptable, since the resolution is much too low. The images are fuzzy and ill-defined. The samples made with masters with smooth glass also are not acceptable, since the surface mirror has mottle and wood grain (Newton's ring) defects. The only fully acceptable samples are those made with the inventive anti-Newton glass masters. Results obtained in this evaluation study are summarized in the table below for masters having the four different glass types.

| Glass Type | AF Target Resolution lp/mm | Surface Mirror | Visual appearance | Acceptability | Y % |
|---|---|---|---|---|---|
| Focal Point AN | 16.00 | Uniform | Sharp, good fine lines, sharp edges | OK | 9.884 |
| Edmund Industrial Optics 45-655 | 1.12 | None | Hazy, No fine lines, Fuzzy edges | No, Poor resolution | 0.066 |
| Edmund Industrial Optics 43-725 | 1.26 | None | Hazy, No fine lines, Fuzzy edges | No, Poor resolution | 0.080 |
| Float glass (smooth both sides) | 16.00 | Severe mottle, wood grain | Sharp, good fine lines, sharp edges | No, Mottle, wood grain in surface mirror | 22.219 |

What is claimed is:
1. A method for copying a hologram comprising:
(a) placing a photosensitive element in contact with an outer surface of a holographic element; the holographic element comprising an optically transparent layer disposed adjacent a master hologram; the optically transparent layer comprises glass and the surface of the optically transparent layer opposite the master hologram comprises the outer surface of the holographic element, wherein the outer surface comprises an etched surface incorporated directly into the surface of the optically transparent layer; the photosensitive element comprising a photosensitive layer disposed adjacent a cover sheet, wherein placing step is performed by placing the outer surface of the holographic element in contact with the surface of the cover sheet opposite the photosensitive layer; and (b) exposing the photosensitive element and the holographic element to a coherent light beam whereby a replicate of the hologram is formed in the photosensitive element;

characterized in that the placing step is performed with the outer surface of the holographic element having a matte surface with a surface roughness measured by profilometry in the range from 5 to 200 nanometers and has a specular reflectance of at least five percent.

2. The method of claim 1 wherein the placing step is performed by utilizing a vacuum to place the outer surface of the holographic element is contact with the cover sheet.

3. The method of claim 1 wherein the photosensitive layer is a photopolymer layer.

4. A holographic element containing a master hologram for use in contact copying to produce a replicate of the hologram wherein an outer surface of the element has a matte surface with a surface roughness measured by profilometry in the range from 5 to 200 nanometers, the element comprising an optically transparent layer comprising glass, the optically transparent layer disposed directly adjacent the master hologram wherein the surface of the optically transparent layer opposite the master hologram comprises the outer surface of the element, wherein the outer surface comprises an etched surface incorporated directly into the surface of the optically transparent layer and has a specular reflectance of at least five percent.

* * * * *